US012744378B2

(12) United States Patent
Masui

(10) Patent No.: US 12,744,378 B2
(45) Date of Patent: Sep. 22, 2026

(54) POWER SUPPLY DEVICE

(71) Applicant: Yazaki Corporation, Tokyo (JP)

(72) Inventor: Hideaki Masui, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 19/068,259

(22) Filed: Mar. 3, 2025

(65) Prior Publication Data

US 2025/0202229 A1 Jun. 19, 2025

Related U.S. Application Data

(63) Continuation of application No. PCT/JP2023/045653, filed on Dec. 20, 2023.

(30) Foreign Application Priority Data

Jan. 23, 2023 (JP) ................................ 2023-007900

(51) Int. Cl.

| | |
|---|---|
| ***H02J 1/08*** | (2026.01) |
| ***B60L 3/00*** | (2019.01) |
| ***B60L 58/21*** | (2019.01) |
| ***B60R 16/033*** | (2006.01) |

(52) U.S. Cl.

CPC ............ *H02J 1/086* (2020.01); *B60L 3/0046* (2013.01); *B60L 3/0092* (2013.01); *B60L 58/21* (2019.02); *B60R 16/033* (2013.01); *B60L 2210/10* (2013.01)

(58) Field of Classification Search

CPC .... B60R 16/033; Y02T 10/70; H02J 2105/37; H02J 2105/33; H02J 9/06; H02J 7/34; H02J 9/061; H02J 7/855; B60L 3/0046; B60L 2210/10; B60L 58/21; B60L 58/18; B60L 3/0092; B60L 3/04

See application file for complete search history.

(56) References Cited

U.S. PATENT DOCUMENTS

| | | | | |
|---|---|---|---|---|
| 2017/0005653 | A1* | 1/2017 | Ueta | H03K 17/22 |
| 2019/0260225 | A1* | 8/2019 | Hida | H02J 1/10 |
| 2021/0050740 | A1* | 2/2021 | Satake | H02H 7/268 |
| 2021/0237670 | A1* | 8/2021 | Takahara | B60R 16/033 |
| 2022/0271559 | A1* | 8/2022 | Shibata | B60R 16/03 |
| 2023/0318350 | A1* | 10/2023 | Motofusa | H02J 9/061 307/11 |

FOREIGN PATENT DOCUMENTS

| | | |
|---|---|---|
| JP | 2021-029093 A | 2/2021 |

* cited by examiner

*Primary Examiner* — Ryan Johnson

(74) *Attorney, Agent, or Firm* — Sughrue Mion, PLLC

(57) ABSTRACT

A power supply device is configured to connect a power converter between a first terminal for power supply for connecting a first power supply and a second terminal for power supply for connecting a second power supply, to connect a first switch and a second switch between a first connection point between the power converter and an interrupt circuit and a second connection point between the power converter and the second terminal for power supply, include a plurality of terminals for load for connecting loads and a plurality of load switches corresponding to the plurality of terminals for load in one-to-one correspondence, wherein each of the plurality of terminals for load is connected to a line connecting the first switch and the second switch via the corresponding load switch.

10 Claims, 5 Drawing Sheets

FIG. 1

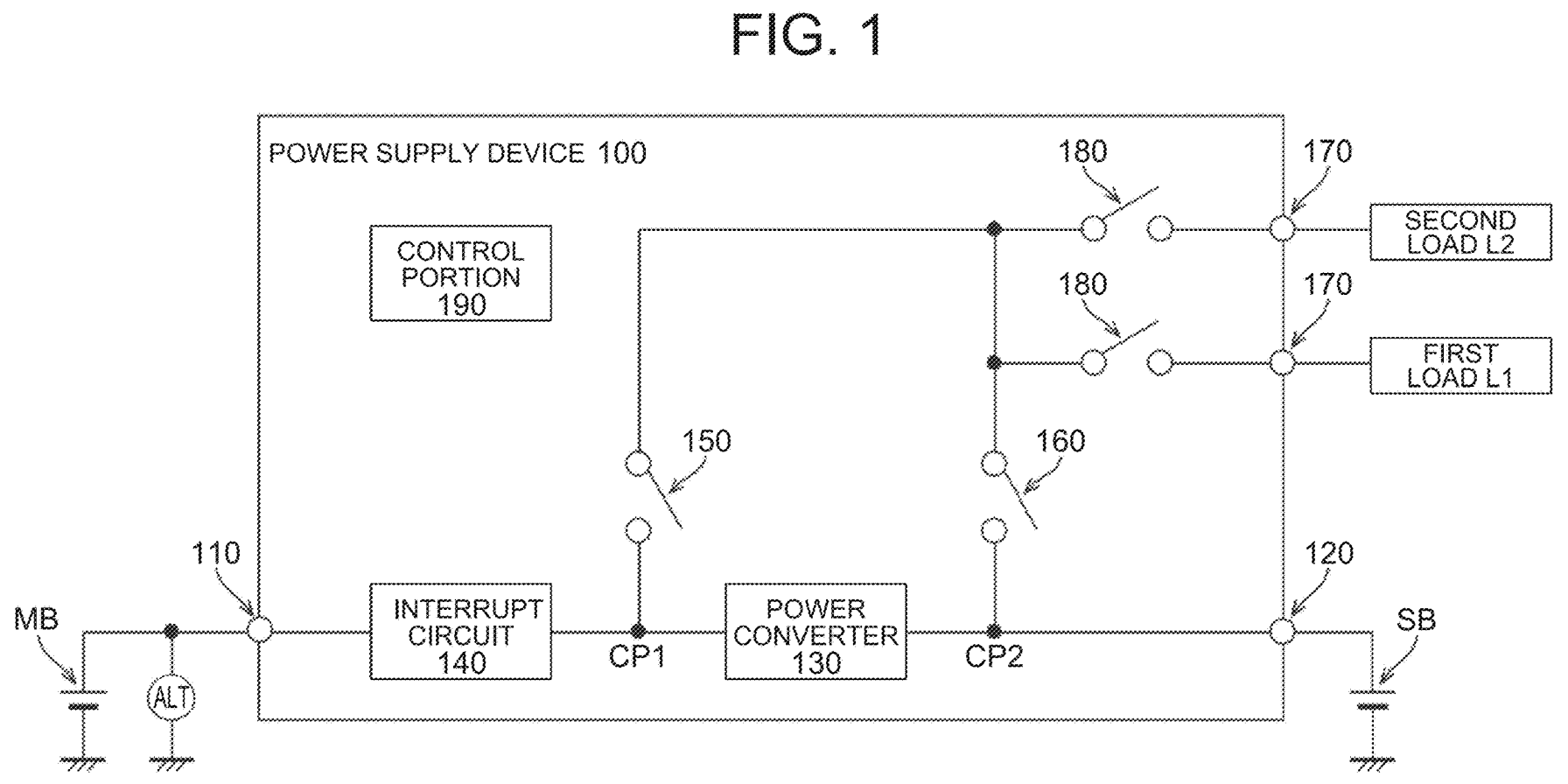

POWER SUPPLY DEVICE 100

CONTROL PORTION 190

INTERRUPT CIRCUIT 140

POWER CONVERTER 130

SECOND LOAD L2

FIRST LOAD L1

SB

MB

ALT

Figure 2:
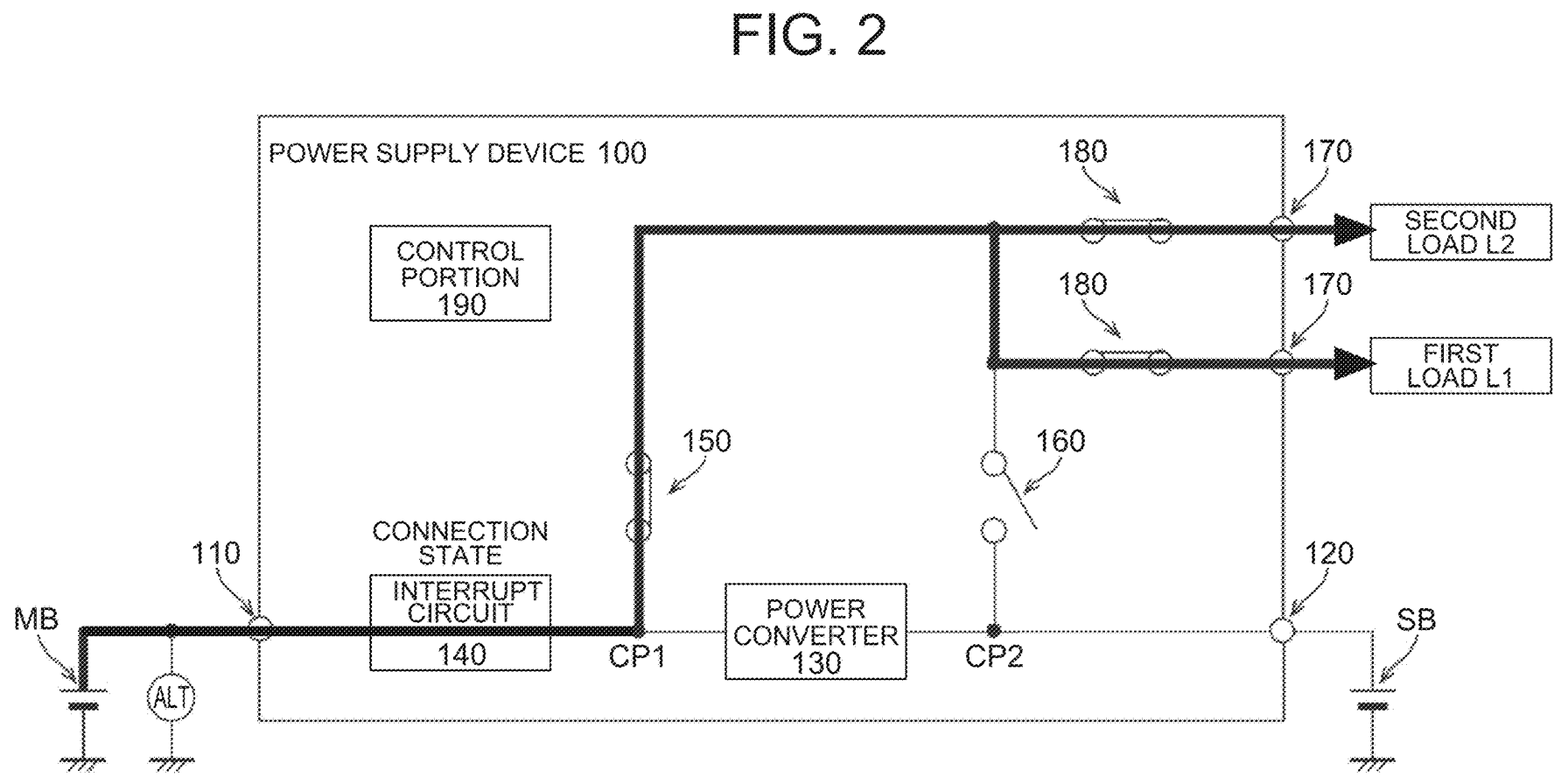

POWER SUPPLY DEVICE 100

CONTROL PORTION 190

CONNECTION STATE

INTERRUPT CIRCUIT 140

POWER CONVERTER 130

SECOND LOAD L2

FIRST LOAD L1

110

120

150

160

170

170

180

180

CP1

CP2

SB

MB

ALT

FIG. 3

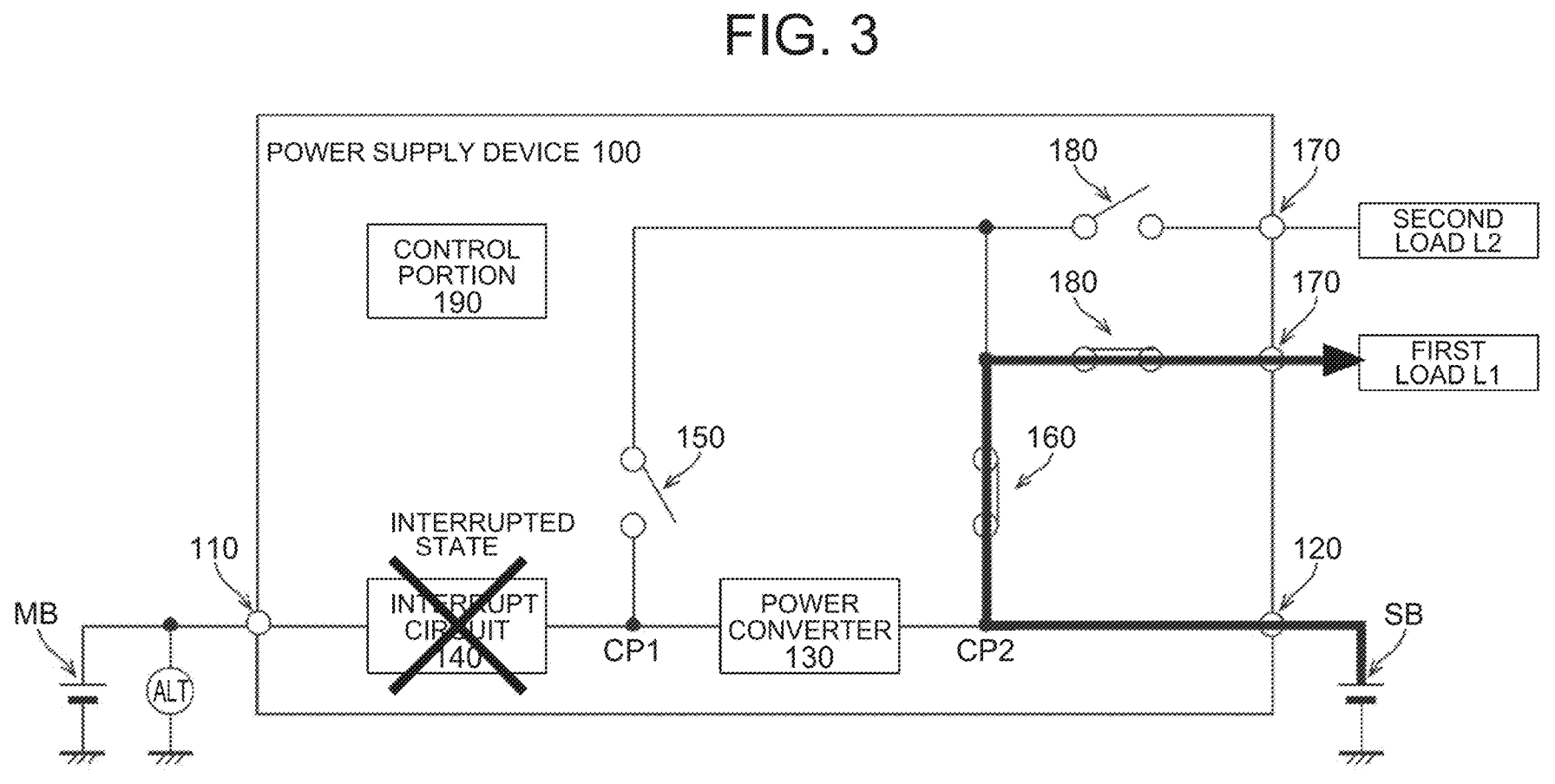

POWER SUPPLY DEVICE 100
CONTROL PORTION 190
INTERRUPTED STATE
INTERRUPT CIRCUIT 140
POWER CONVERTER 130
SECOND LOAD L2
FIRST LOAD L1
SB
MB
ALT
CP1
CP2
110
120
150
160
170
170
180
180

FIG. 5

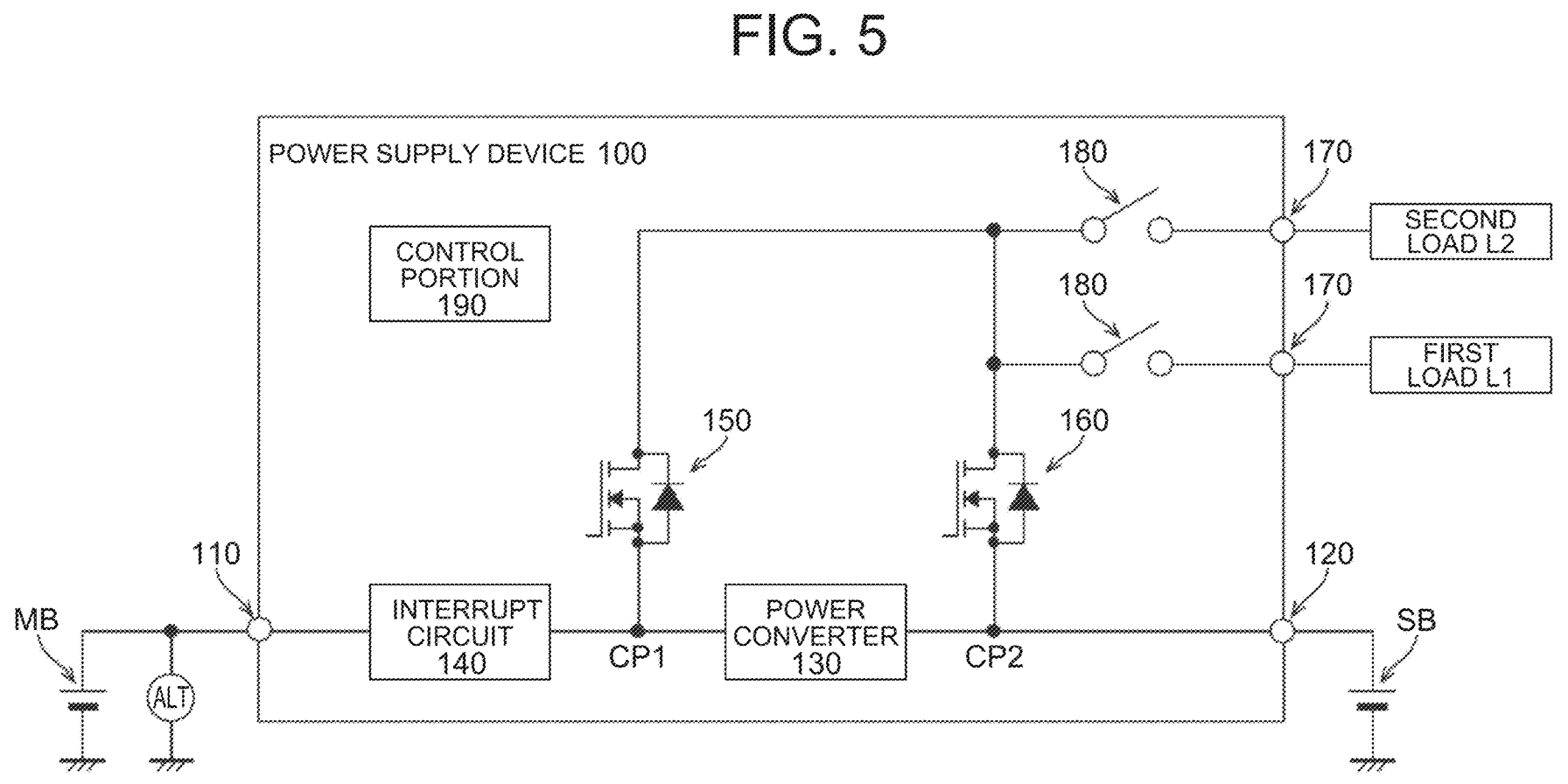

SECOND LOAD L2
FIRST LOAD L1
170
170
120
SB
180
180
160
CP2
POWER CONVERTER 130
150
CP1
POWER SUPPLY DEVICE 100
CONTROL PORTION 190
INTERRUPT CIRCUIT 140
110
ALT
MB

POWER SUPPLY DEVICE

This application is a continuation application of PCT International Application No. PCT/JP2023/045653, filed on Dec. 20, 2023, whose priority is claimed on Japanese Patent Application No. 2023-007900, filed on Jan. 23, 2023. All contents of both the PCT International Patent Application and the Japanese Patent Application are incorporated herein by reference.

TECHNICAL FIELD

The present disclosure relates to a power supply device.

BACKGROUND ART

When a vehicle is being used, it is possible for the electric power supply to the load relating to functions such as traveling, steering, stopping, opening/closing doors and the like to be maintained. Accordingly, a technology for realizing the power redundancy by including a sub battery in addition to a main battery is developed (for example, see Patent Document 1).

CITATION LIST

Patent Documents

[Patent Document 1] JP 2021-29093A

SUMMARY OF THE INVENTION

Technical Problem

However, according to the technology disclosed in Patent Document 1, according to the conventional technology, during the circuit design, the circuit with power redundancy and the circuit without power redundancy are designed separately. Accordingly, in a case in which the load without any power redundancy is to be changed with the power redundancy, it is necessary to redesign the entire circuit.

Accordingly, an object of the present invention is to provide a power supply device in which the change of load with the power redundance is easy.

Solution to Problem

In order to solve the above-identified technical problem, a power supply device according to an embodiment of the present invention includes a first terminal for power supply for connecting a first power supply; a second terminal for power supply for connecting a second power supply; a power converter connected between the first terminal for power supply and the second terminal for power supply; an interrupt circuit connected between the first terminal for power supply and the power converter; a first switch and a second switch that are connected between a first connection point between the power converter and the interrupt circuit, and a second connection point between the power converter and the second terminal for power supply; a plurality of terminals for load for connecting loads; and a plurality of load switches corresponding to the plurality of terminals for load in one-to-one correspondence, wherein each of the plurality of terminals for load is connected to a line connecting the first switch and the second switch via the corresponding load switch.

A control method according to an embodiment of the present invention is a control method being executed by a computer to control the interrupt circuit, the first switch, the second switch, and the load switch of the power supply device according to claim 1, wherein the control method includes, when a power supply connected to the first terminal for power supply is abnormal, turning off the interrupt circuit and the first switch; turning on the second switch, turning on the load switches corresponding to the terminals for load to which the first loads where the power redundancy is necessary are connected among the plurality of terminals for load, and turning off the load switches corresponding to the terminals for load to which the second loads where the power redundancy is unnecessary are connected among the plurality of terminals for load.

A control program according to an embodiment of the present invention causes a computer to execute the above-described control method.

A recording medium according to an embodiment of the present invention is a computer-readable recording medium to record the above-described control program.

Effect of the Invention

According to the present invention, it is possible to provide a power supply device in which the change of load with the power redundance is easy.

BRIEF DESCRIPTION OF THE DRAWINGS

FIG. 1 is a view showing a power supply device 100 according to an embodiment of the present invention.

FIG. 2 is a view for describing a power flow during a normal period.

FIG. 3 is a view for describing a power flow when a first power supply connected to a first terminal for power supply 110 is abnormal.

FIG. 5 is a view showing a power supply device 100 according to an embodiment of the present invention.

DESCRIPTION OF EMBODIMENTS

<Power Supply Device 100>

Figure 4:
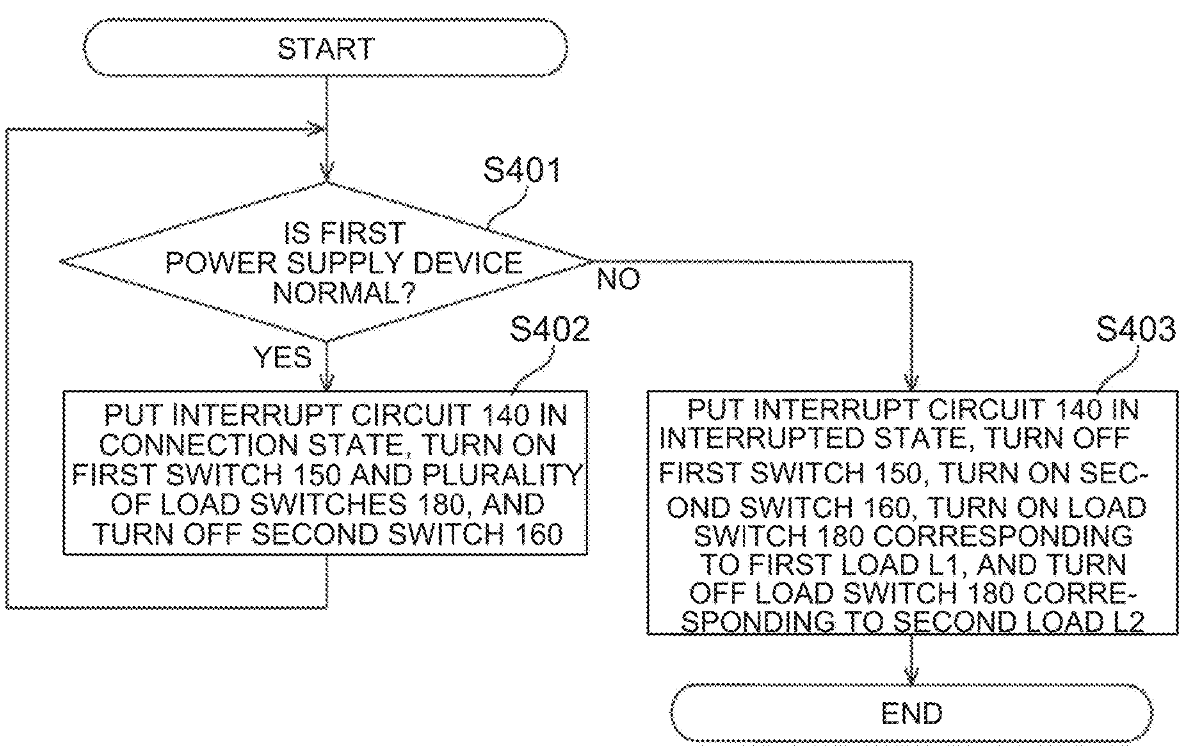
FIG. 4 is a view showing an example of processing operations in a control portion 190.

FIG. 1 is a view showing a power supply device 100 according to an embodiment of the present invention. The power supply device 100 includes a first terminal for power supply 110, a second terminal for power supply 120, a power converter 130, an interrupt circuit 140, a first switch 150, a second switch 160, a plurality of loads 170, a plurality of load switches 180, and a control portion 190.

The first terminal for power supply 110 is a terminal for connecting a first power supply. The first power supply, for example, as shown in FIG. 1, is a main battery MB. The first terminal for power supply 110, as shown in FIG. 1, may be configured to connected with an alternator ALT.

The second terminal for power supply 120 is a terminal for connecting a second power supply. The second power supply, for example, as shown in FIG. 1, is a sub battery SB.

The power converter 130 is a DC/DC converter to be configured to convert the input power and to output the converted power. The power converter 130 is connected between the first terminal for power supply 110 and the second terminal for power supply 120. In a case in which the first terminal for power supply 110 is connected with the main battery MB as the first power supply, and the second terminal for power supply 120 is connected with the sub battery SB as the second power supply, the power converter 130, for example, supplies the sub battery SB with the power output from the main battery MB, for example.

The interrupt circuit 140 includes two terminals, and is configured to switch between a connection state in which the two terminals are connected and an interrupted state in which the two terminals are interrupted. The interrupt circuit 140 is connected between the first terminal for power supply 110 and the power converter 130. The interrupt circuit 140 is preferable to be configured by two switching elements (for example, MOSFET (Metal-Oxide-Semiconductor Field-Effect Transistor) connected in a Back to Back manner.

A first switch 150 and a second switch 160 are connected between a first connection point CP1 that is between the power converter 130 and the interrupt circuit 140, and a second connection point CP2 that is between the power converter 130 and the second terminal for power supply 120. As shown in FIG. 1, the first switch 150 is connected to the side of the first connection point CP1, and the second switch 150 is connected to the side of the second connection point CP2.

Each of the plurality of terminals for load 170 is a terminal for connecting the load, and is corresponding to the plurality of load switches 180 respectively, in a one-to-one correspondence. As shown in FIG. 1, each of the plurality of terminals for load 170 is connected to a line connecting the first switch 150 and the second switch 160 via the corresponding load switch 180. The loads connected to the plurality of terminals for load 170 include a first load L1 where the power redundancy is necessary (for example, the load relating to the functions of travelling, steering, stopping, and opening/closing door) and a second load L2 where the power redundancy is unnecessary. In the example shown in FIG. 1, the power supply device 100 includes two of terminals for load 170, one terminal for load 170 is connected with the first load L1 and the other terminal for load 170 is connected with the second load L2. Each of the plurality of load switches 180 is an Intelligent Power Device (IPD), for example.

Accordingly, in the present embodiment, the first switch 150 is connected between the first connection point CP1 and the plurality of load switches 180. That is, according to the present embodiment, between the first terminal for power supply 110 and the plurality of terminals for load 170, the interrupt circuit 140, the first switch 150, and the load switch 180 are connected thereto. Accordingly, according to the present embodiment, when the interrupt circuit 140 is in the connection state, the first switch 150 is turned on, and the load switch 180 is turned on, the first terminal for power supply 110 and the terminal for load 170 are in an electrically connected state, and as shown in FIG. 2, from the first power supply (for example, main battery MB) connected to the first terminal for power supply 110 to the loads (in the example shown in FIG. 2, the first load L1 and the second load L2) connected to the terminal for load 170, the power is supplied via the interrupt circuit 140, the first switch 150, and the load switch 180.

Also, according to the present embodiment, the second switch 160 is connected between the second connection point CP2 and the plurality of load switches 180. That is, according to the present embodiment, between the second terminal for power supply 120 and the plurality of terminals for load 170, the second switch 160 and the load switch 180 are connected. Accordingly, when the second switch 160 is turned on and the load switch 180 is turned on, the second terminal for power supply 120 and the terminal for load 170 are in the electrically connected state, and as shown in FIG. 3, from the power supply (for example, the sub battery SB) connected to the second terminal for power supply 120 to the load (in the example shown in FIG. 3, the first load L1) connected to the terminal for load 170, the power is supplied via the second switch 160 and the load switch 180.

The control portion 190 controls the interrupt circuit 140, the first switch 150, the second switch 160, and the plurality of load switches 180. The control portion 190, for example, is configured by a computer. The control portion 190 is configured to control the interrupt circuit 140, the first switch 150, the second switch 160, and the plurality of load switches 180 based on whether the power supply (for example, the main battery MB) connected to the first terminal for power supply 110 is normal or not. For example, the control portion 190 measures a voltage value of the power input to the first terminal for power supply 110, and when the measured voltage value is equal to or greater than a predetermined value, determines that the power supply (for example, the main battery MB) connected to the first terminal for power supply 110 is normal.

<Control During Normal Period>

During a normal period, that is, when the first power supply (for example, the main battery MB) connected to the first termina for power supply 110 is normal, as shown in FIG. 2, the control portion 190 puts the interrupt circuit 140 in the connection state, turns on the first switch 150 and the plurality of load switches 180, and turns off the second switch 160. Accordingly, according to the present embodiment, when the power supply connected to the first terminal for power supply 110 is normal, as shown in FIG. 2, it is possible to supply power from the power supply connected to the first terminal for power supply 110 to the load connected to the terminal for load 170.

<Control when Main Battery MB is Abnormal>

When the first power supply (for example, the main battery MB) connected to the first terminal for power supply 110 is abnormal, as shown in FIG. 3, the control portion 190 puts the interrupt circuit 140 in the interrupted state, turns off the first switch 150, and turns on the second switch 160. Also, at this time, as shown in FIG. 3, the control portion 190 turns on the load switch 180 corresponding to the terminal for load 170 connected with the first load L1 (the load where the power redundancy is necessary), and turns off the load switch 180 corresponding to the terminal for load 170 connected with the second load L2 (the load where the power redundancy is unnecessary). At this time, the control portion 190 may be configured to store information regarding the first load L1 or the second load L2 is connected to each of the plurality of terminals for load 170 in prior, and control the load switch 180 based on this information.

Accordingly, according to the present embodiment, when the power supply connected to the first terminal for power supply 110 is abnormal, as shown in FIG. 3, it is possible to supply power from the power supply (for example, the sub battery SB) connected to the second terminal for power supply 120 to the load (the first load L1) where the power redundancy is necessary.

Also, according to the present embodiment, when the load (the second load L2) where the power redundancy is unnecessary is changed to the load (the first load L1) where the power redundancy is necessary, it is only necessary to change the software of the control portion 190 while it is unnecessary to change the circuit design thereof. Accordingly, according to the present embodiment, it is possible to provide the power supply device in which the change of load with the power redundance is easy.

FIG. 4 is a view showing an example of processing operations in the control portion 190. The control portion 190 is configured that, during the period when the first power supply (for example, the main battery MB) connected to the first terminal for power supply 110 is normal (Step S401, YES), the control portion 190 puts the interrupt circuit 140 in the connection state, turns on the first switch 150 and the plurality of load switches 180, and turns off the second switch 160 (Step S402). During the period when the first power supply (for example, the main battery MB) connected to the first terminal for power supply 110 is abnormal (Step S401, NO), the control portion 190 puts the interrupt circuit 140 in the interrupted state, turns off the first switch 150, turns on the second switch 160, turns on the load switch 180 corresponding to the terminal for load 170 connected with the first load L1 (the load where the power redundancy is necessary), and turns off the load switch 180 corresponding to the terminal for load 170 connected with the second load L2 (the load where the power redundancy is unnecessary) (Step S403).

<Utilization of Sub Battery SB>

The main battery MB is connected to the first terminal for power supply 110, and the sub battery SB is connected to the second terminal for power supply 120, however, during the period when the main battery MB is normal (that is, during the normal period), the sub battery SB may be used instead of the main battery MB.

For example, the control portion 190 may be configured to, when the first power supply connected to the first terminal for power supply 110 is normal, and some loads (for example, the first load L1) among the loads connected to the plurality of terminals for load 170 are not in use, put the interrupt circuit 140 in the interrupted state, turn off the first switch 150, turns on the second switch 160, turn on the load switches 180 corresponding to the terminals for load 170 connected with the loads in use among the plurality of terminals for load 170, and turn off the load switches 180 corresponding to the terminals for load 170 connected with the loads that are not in use among the plurality of terminals for load 170.

In this manner, it is possible to reduce the usage period of the main battery MB so as to extend the life of the main battery MB.

<First Switch 150 and Second Switch 160>

For example, as shown in FIG. 5, the first switch 150 may be configured from the switching element (for example, MOSFET) having a body diode. At this time, in order to prevent any backflow, a forward direction of the body diode is set to be from the first connection point CP1 to the load switch 180. In the example shown in FIG. 5, the first switch 150 is an N-type MOSFET, wherein the source is connected to the first connection point CP1, and the drain is connected to the load switch 180.

For example, as shown in FIG. 5, the second switch 160 may be configured from the switching element (for example, MOSFET) having a body diode. At this time, in order to prevent any backflow, a forward direction of the body diode is set to be from the second connection point CP2 to the load switch 180. In the example shown in FIG. 5, the second switch 160 is an N-type MOSFET, wherein the source is connected to the second connection point CP2, and the drain is connected to the load switch 180.

As shown in FIG. 5, in the case in which the first switch 150 and the second switch 160 are made from the switching elements having the body diodes respectively, wherein the forward direction of the body diode of the first switch 150 is set to be from the first connection point CP1 to the load switch 180, and the forward direction of the body diode of the second switch 160 is set to be from the second connection point CP2 to the load switch 180, the connection between the first switch 150 and the second switch 160 are in the Back to Back manner. Accordingly, in this case, when either of the first switch 150 or the second switch 160 is turned off, a power flow passing through both of the first switch 150 and the second switch 160 is not generated.

The present invention has been described above using preferred embodiments of the present invention. Although the present invention has been described herein with reference to specific examples, various modifications and changes can be made to these examples without departing from the spirit and scope of the invention as set forth in the claims.

REFERENCE SIGNS LIST

100 power supply device
110 first terminal for power supply
120 second terminal for power supply
130 power converter
140 interrupt circuit
150 first switch
160 second switch
170 terminal for load
180 load switch
190 control portion

What is claimed is:

1. A power supply device, comprising:

a first terminal for power supply for connecting a first power supply;

a second terminal for power supply for connecting a second power supply;

a power converter connected between the first terminal for power supply and the second terminal for power supply;

an interrupt circuit connected between the first terminal for power supply and the power converter, and configured to switch between a connected state and an interrupted state;

a first switch and a second switch that are connected between a first connection point between the power converter and the interrupt circuit, and a second connection point between the power converter and the second terminal for power supply;

a plurality of terminals for load for connecting loads; and a plurality of load switches corresponding to the plurality of terminals for load in one-to-one correspondence, wherein each of the plurality of terminals for load is connected to a line connecting the first switch and the second switch via the corresponding load switch.

2. A power supply device, comprising:

a first terminal for power supply for connecting a first power supply;

a second terminal for power supply for connecting a second power supply;

a power converter connected between the first terminal for power supply and the second terminal for power supply;

an interrupt circuit connected between the first terminal for power supply and the power converter;

a first switch and a second switch that are connected between a first connection point between the power converter and the interrupt circuit, and a second connection point between the power converter and the second terminal for power supply;

a plurality of terminals for load for connecting loads; and a plurality of load switches corresponding to the plurality of terminals for load in one-to-one correspondence, wherein each of the plurality of terminals for load is connected to a line connecting the first switch and the second switch via the corresponding load switch, wherein the first switch is a switching element that is connected between the first connection point and the plurality of load switches, and has a body diode with a forward direction set as a direction from the first connection point to the plurality of load switches, and the second switch is a switching element that is connected between the second connection point and the plurality of load switches, and has a body diode with a forward direction set as a direction from the second connection point to the plurality of load switches.

3. The power supply device according to claim 1, wherein at least one of the plurality of load switches is an intelligent power device.

4. A power supply device, comprising:

a first terminal for power supply for connecting a first power supply;

a second terminal for power supply for connecting a second power supply;

a power converter connected between the first terminal for power supply and the second terminal for power supply;

an interrupt circuit connected between the first terminal for power supply and the power converter;

a first switch and a second switch that are connected between a first connection point between the power converter and the interrupt circuit, and a second connection point between the power converter and the second terminal for power supply;

a plurality of terminals for load for connecting loads;

a plurality of load switches corresponding to the plurality of terminals for load in one-to-one correspondence; and a control portion configured to control the first switch, the second switch, and the load switches, wherein each of the plurality of terminals for load is connected to a line connecting the first switch and the second switch via the corresponding load switch, and wherein the first switch is connected between the first connection point and the plurality of terminals for load, the second switch is connected between the second connection point and the plurality of terminals for load, the control portion is configured to, when a power supply connected to the first terminal for power supply is abnormal, put the interrupt circuit in an interrupted state, turn off the first switch, turn on the second switch, turn on the load switches corresponding to the terminals for load to which first loads where the power redundancy is necessary are connected among the plurality of terminals for load, and turn off the load switches corresponding to the terminals for load to which second loads where the power redundancy is unnecessary are connected among the plurality of terminals for load.

5. The power supply device according to claim 4, wherein the control portion is configured to, when the power supply connected to the first terminal for power supply is normal and some loads among the loads connected to the plurality of terminals for load are not in use, put the interrupt circuit in an interrupted state, turn off the first switch, turn on the second switch, turn on the load switches corresponding to the terminals for load to which the loads in use are connected among the plurality of terminals for load, and turn off the load switches corresponding to the terminals for load to which the loads not in use are connected among the plurality of terminals for load.

6. A control method being executed by a computer to control the interrupt circuit, the first switch, the second switch, and the plurality of load switches of the power supply device according to claim 1, the control method comprising:

when a power supply connected to the first terminal for power supply is abnormal, turning off the interrupt circuit and the first switch;

turning on the second switch;

turning on the load switches corresponding to the terminals for load to which first loads where the power redundancy is necessary are connected among the plurality of terminals for load; and turning off the load switches corresponding to the terminals for load to which second loads where the power redundancy is unnecessary are connected among the plurality of terminals for load.

7. A non-transitory computer-readable recording medium configured to record the control method according to claim 6.

8. The power supply device according to claim 1, wherein the first switch is a switching element that is connected between the first connection point and the plurality of load switches, and has a body diode with a forward direction set as a direction from the first connection point to the plurality of load switches, and the second switch is a switching element that is connected between the second connection point and the plurality of load switches, and has a body diode with a forward direction set as a direction from the second connection point to the plurality of load switches.

9. The power supply device according to claim 1, further comprising a control portion configured to control the interrupt circuit, the first switch, the second switch, and the load switches, wherein the first switch is connected between the first connection point and the plurality of terminals for load, the second switch is connected between the second connection point and the plurality of terminals for load, the control portion is configured to, when a power supply connected to the first terminal for power supply is abnormal, put the interrupt circuit in the interrupted state, turn off the first switch, turn on the second switch, turn on the load switches corresponding to the terminals for load to which first loads where the power redundancy is necessary are connected among the plurality of terminals for load, and turn off the load switches corresponding to the terminals for load to which second loads where the power redundancy is unnecessary are connected among the plurality of terminals for load.

10. The power supply device according to claim 9, wherein the control portion is configured to, when the power supply connected to the first terminal for power supply is normal and some loads among the loads connected to the plurality of terminals for load are not in use, put the interrupt circuit in the interrupted state, turn off the first switch, turn on the second switch, turn on the load switches corresponding to the terminals for load to which the loads in use are connected among the plurality of terminals for load, and turn off the load switches corresponding to the terminals for load to which the loads not in use are connected among the plurality of terminals for load.

* * * * *